United States Patent [19]

Emberson

[11] Patent Number: 4,832,375
[45] Date of Patent: May 23, 1989

[54] DRAINAGE ELEMENT

[75] Inventor: John E. Emberson, Markham, Canada

[73] Assignee: Enpoco Limited, Scarborough, Canada

[21] Appl. No.: 189,842

[22] Filed: May 3, 1988

[30] Foreign Application Priority Data

Jun. 10, 1987 [CA] Canada .................................. 539315

[51] Int. Cl.$^4$ ............................................. F16L 35/00
[52] U.S. Cl. ......................................... 285/4; 285/12; 285/56; 285/177
[58] Field of Search .................... 285/3, 4, 56, 57, 58, 285/59, 60, 12, 177; 137/356; 4/25 LR

[56] References Cited

U.S. PATENT DOCUMENTS

| 2,021,745 | 11/1935 | Pfefferle et al. | 285/3 X |
| 2,596,182 | 5/1952 | Sosaya | 285/3 |
| 4,059,289 | 11/1977 | Morris et al. | 285/56 |
| 4,470,162 | 9/1984 | Marshall | 285/56 X |
| 4,694,513 | 9/1987 | Kiziah | 285/4 X |

Primary Examiner—Dave W. Arola
Attorney, Agent, or Firm—Nixon & Vanderhye

[57] ABSTRACT

A drainage element is provided comprising a generally cylindrical body into which a removable gasket is inserted in the lower end thereof. Located above the gasket are pipe stops which project inwardly from the interior wall of the body. The drainage element is useful with a drain pipe which is inserted into the gasket to butt the pipe stops or the gasket can be removed, the pipe stops broken away from the body and the drain used with a drain pipe of which the upper edge butts the lower edge of the body.

1 Claim, 2 Drawing Sheets

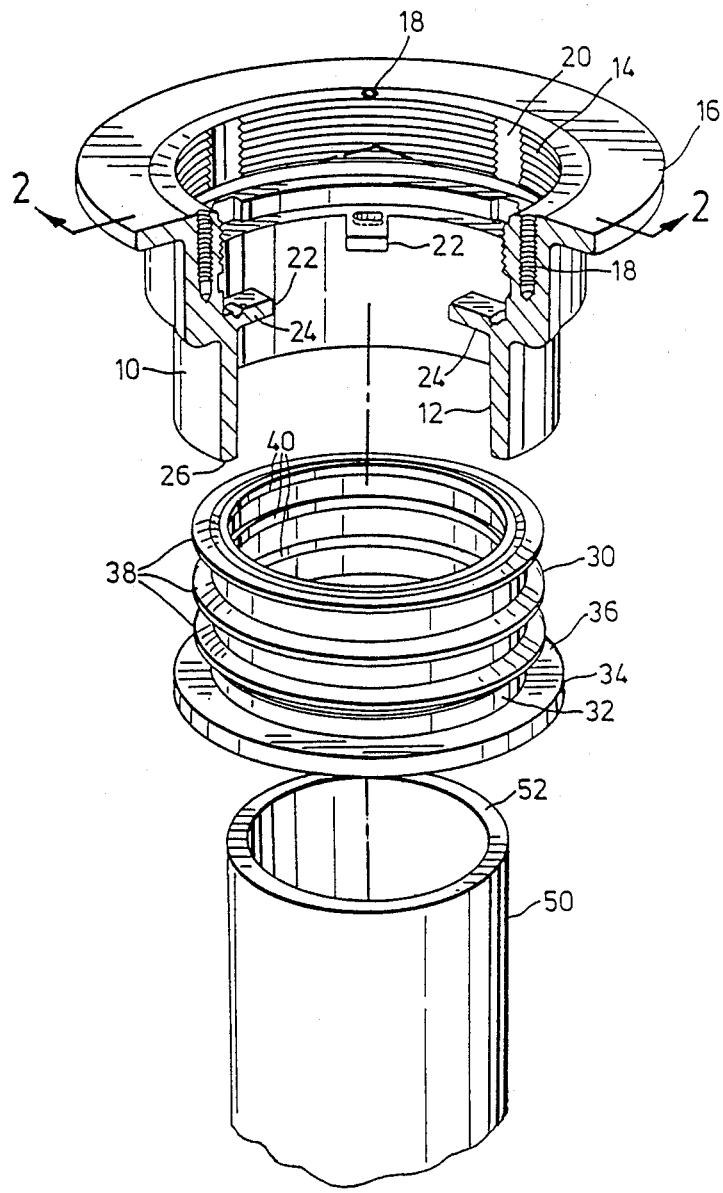

DRAINAGE ELEMENT

The present invention relates to drainage elements. A drainage element of the kind with which the present invention is concerned comprises a generally cylindrical, flanged body, which is set in to a surface to be drained. The body has an upwardly open threaded socket into which a grate or strainer frame, having a dependent, externally threaded section, is inserted and adjusted for height.

Drainage elements of this type are known in the art and used in a number of environments wherever the accumulation of fluids on a surface is undesirable. In the particular application as a floor drain for example, one known type has a cylindrical gasket with annular sealing ribs, inserted into the throat of the drain to engage an annular flange formed on the internal surface of the body, the flange serving as a gasket cover and as a pipe stop. The gasket has an outwardly projecting radial flange which butts against the lower most edge of the body. A drain pipe is fitted into the drain to butt against the pipe stop/gasket cover flange with the gasket providing the seal between the drain pipe and the walls of the body.

Another type of floor drain has a plain throat of the same diameter as the drain pipe with which it is used. The upper edge of a drain pipe is simply butted with a lower edge of the body and a seal is achieved using a sleeve-like gasket disposed about adjacent end regions of the body and drain pipe and secured in position with hose clamps.

The present invention seeks to provide a drainage element which can be used in either of the above described type of fittings. Accordingly, there is provided a drainage element having a generally cylindrical body, a removable gasket inserted into the lower end of the body and a pipe stop formed integrally with and projecting inwardly from the interior wall of the body above the gasket, the junction between the pipe stop and the interior of the wall being frangible. With such an arrangement the drainage element can be used with a drain pipe inserted into the gasket and with its upper end butted against the pipe stop or the gasket may be removed, the pipe stop broken away and the drain used with a drain pipe of which the upper edge butts with the lower edge of the drain.

A preferred embodiment of the invention will now be described by way of example only with reference to the accompanying drawings in which:

FIG. 1 is an exploded, partially cut away view of a drain, gasket and a drain pipe;

Figure 3:
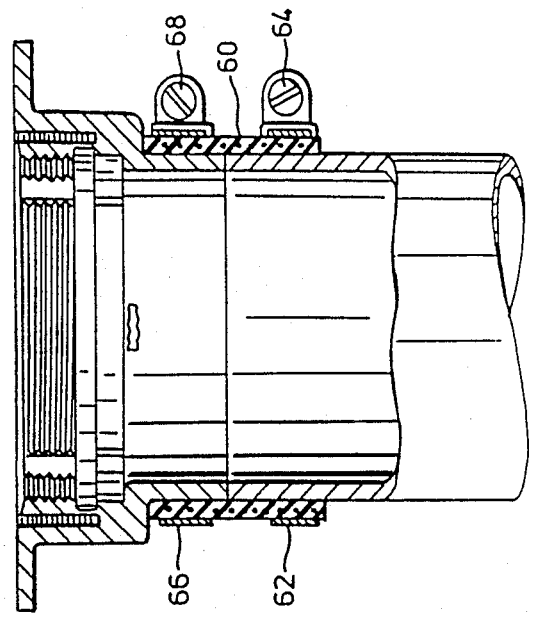
FIG. 3 is a cross-sectional view of the drain of FIGS. 1 and 2 assembled with a larger drain pipe in butting relationship.

The drain comprises a generally cylindrical body 10 having a smooth-sided throat 12 at its lower region and a threaded socket 14 at its upper region. Projecting outwardly from the top of the body is a radial flange 16. In use, a grate and grate frame, not shown, having a screw-threaded section is inserted into the socket 14 and adjusted for height to be flush with the finished floor. Threaded screw holes 18 are provided in the upper edge of the body so that bolts can be used to tighten a clamping ring to trap a membrane between the ring and the upper surface of flange 16. The threads of the socket are axially slotted as at 20 to provide weepholes for the escape of water not passing through the grate.

Three pipe stops 22 project inwardly from the upper end of the throat of the drain body and are disposed at 120 degree centres. The pipe stops are formed integrally with the drain body and the junction of the pipe stops with the drain body is weakened by being of reduced thickness as at 24. Thus, the pipe stops can be removed by a sharp rap with a tool.

The gasket 30 comprises a generally cylindrical body 32 with an external annular flange 34 the upper surface 36 of which abuts the lower edge 26 of the drain body. Three spaced sealing ribs 38 project from the outer surface of the cylindrical body 32 provide sealing engagement with the interior surface of the throat 12 of the drain body 10. Internal radial sealing ribs 40 provide sealing engagement with the outer surface of drain pipe 50.

Figure 2:
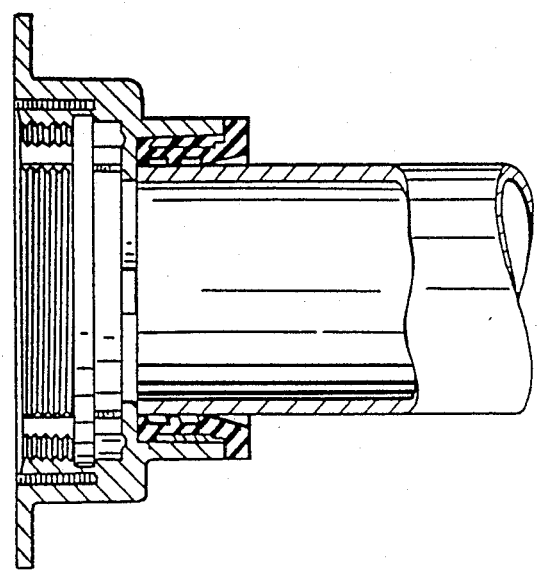
FIG. 2 is a cross-sectional view of the drain of FIG. 1 assembled with a drain pipe in male-to-female relationship.

The length of the gasket is such that its upper surface bears against the pipe stop 22 and the upper surface 36 of the flange 34 bears against the lower edge 26 of the drain body, this is shown in FIG. 2.

During assembly, the drain pipe and a drain are mated so that the upper edge 52 of the drain pipe butts against the pipe stops 22 to ensure an effective seal and to prevent over-insertion of the drain pipe.

If the drain of FIG. 1 is to be used with a drain pipe of the same diameter as the throat of the drain, the gasket is removed from the drain and the pipe stops, which would otherwise obstruct the flow of water through the drain and cause the accumulation of contaminants, are broken away, this as shown in FIG. 3.

A reinforced rubber sealing sleeve 60 is disposed about the upper edge of the drain pipe and held firmly in place by a hose clamp 62 of which the screw is indicated at 64. The drain is then inserted into the open end of the sleeve 2 so that its lowermost edge abuts the uppermost edge of the drain pipe. A second hose clamp 66 of which the screw is visible at 68 then secures the sleeve to the drain, completing the seal.

It should be apparent to one skilled in the art, that the present drainage element is not limited to use solely as a floor drain, but can be utilized in a variety of applications such as roof drains and clean out units wherever a mating drain and drain pipe is required.

We claim:

1. A drainage element comprising a generally cylindrical body having an interior wall and an upper and lower end, a removable gasket inserted into the lower end of the body, and a pipe stop formed integrally with and projecting radially inwardly from the interior wall of the body above the gasket, the junction between the pipe stop and the interior wall being frangible, wherein said gasket has an upper edge and said upper edge of said gasket abuts said pipe stop, and further wherein said gasket has a lower edge and an outer annular flange at the lower edge, said flange having an upper surface, the upper surface of said flange engaging the lower end of said body.

* * * * *